Sept. 16, 1952 — E. F. CROCKETT — 2,610,891
SEMITRAILER CONSTRUCTION
Filed June 18, 1947 — 3 Sheets-Sheet 1
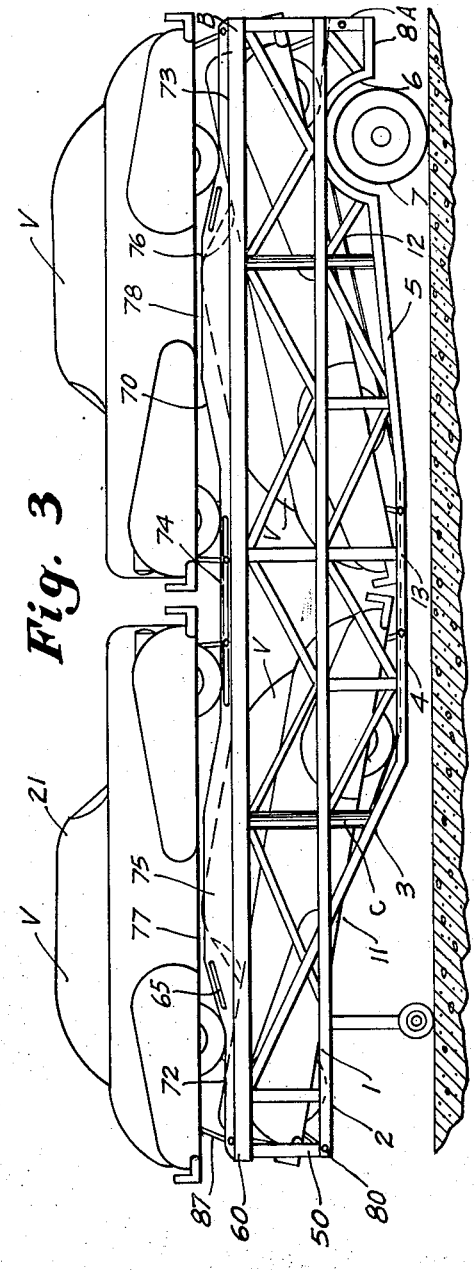
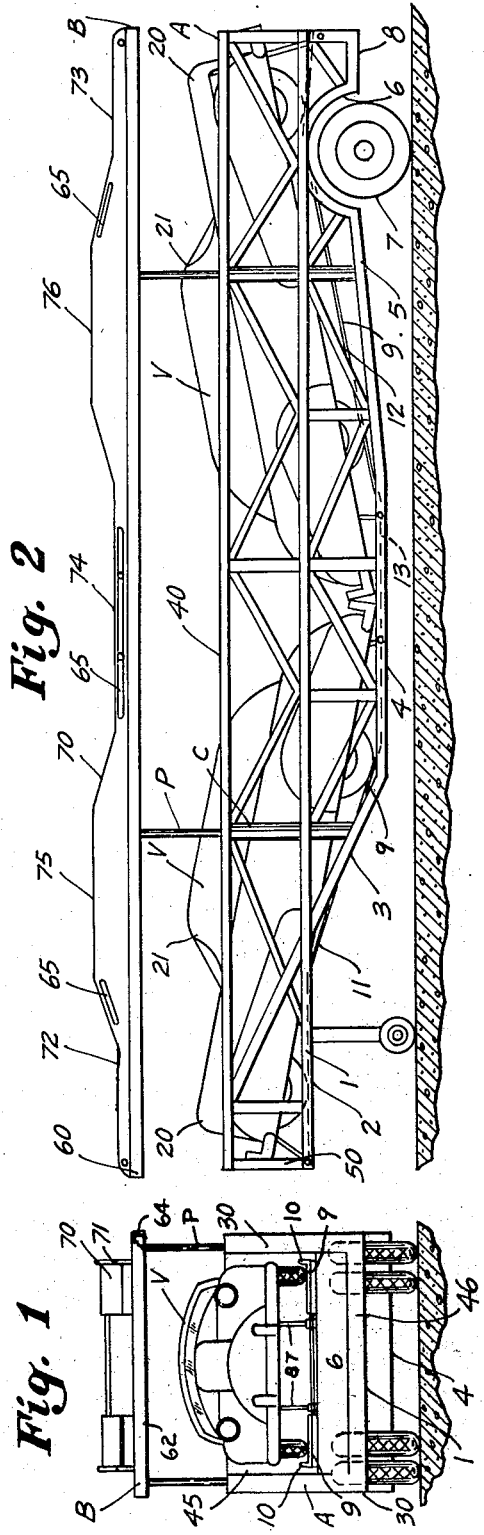
INVENTOR
BY ELMER F. CROCKETT
Pearson + Pearson
ATTORNEYS

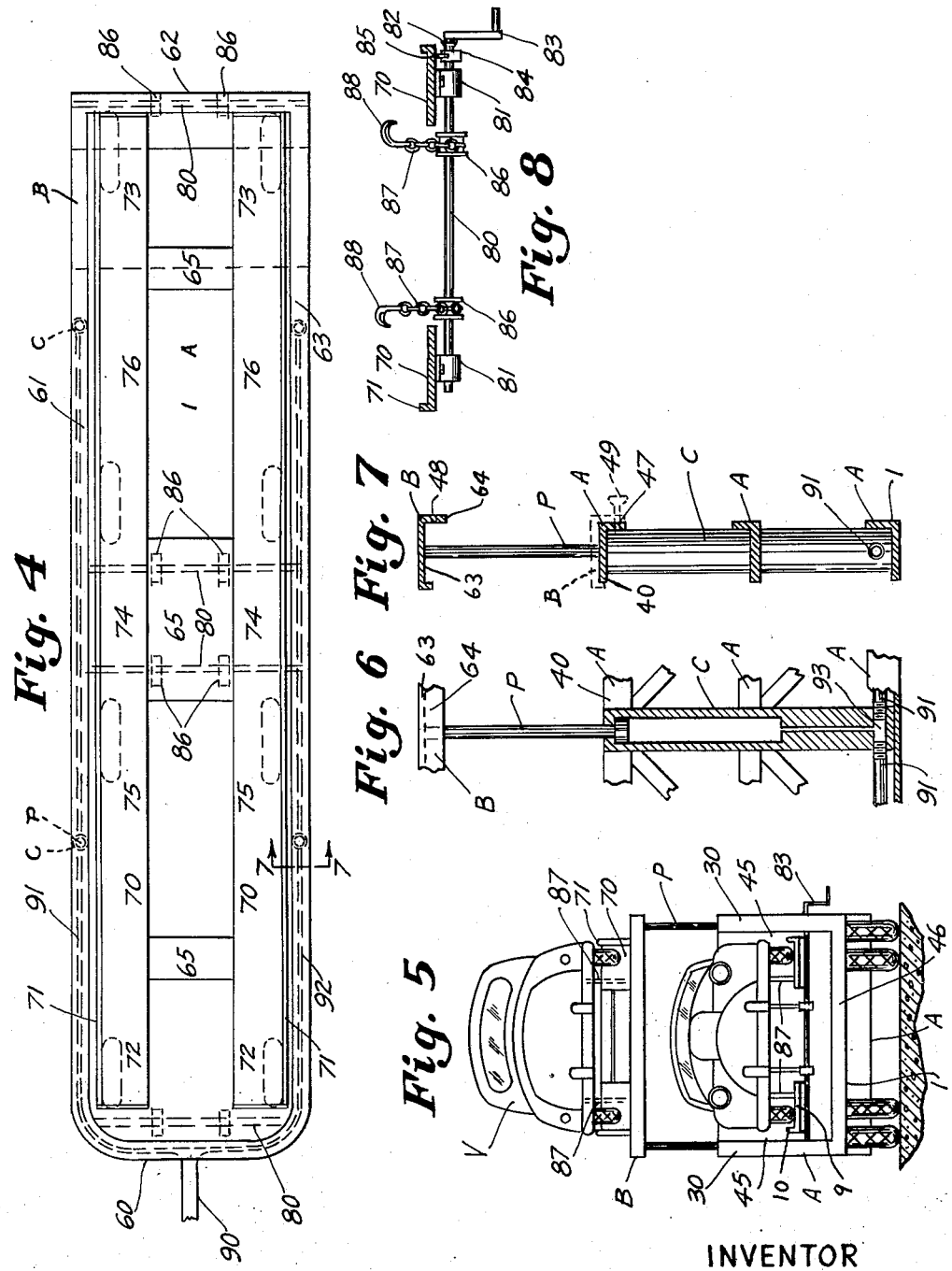

Sept. 16, 1952 E. F. CROCKETT 2,610,891
SEMITRAILER CONSTRUCTION
Filed June 18, 1947 3 Sheets-Sheet 3
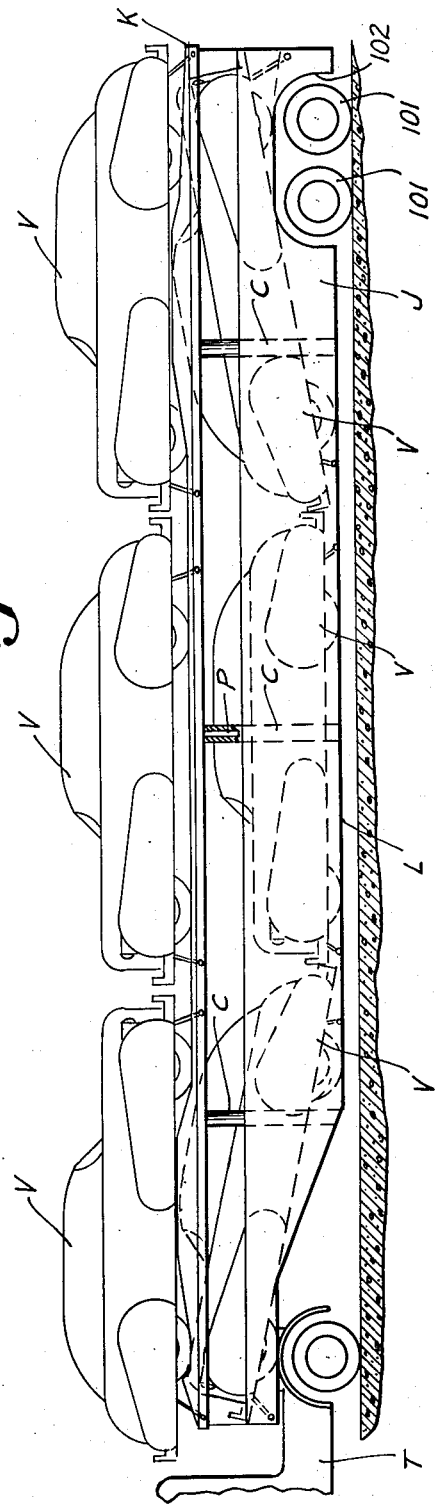
INVENTOR
BY ELMER F. CROCKETT
Pearson + Pearson
ATTORNEYS Patented Sept. 16, 1952

2,610,891

UNITED STATES PATENT OFFICE 2,610,891

SEMITRAILER CONSTRUCTION

Elmer F. Crockett, Lowell, Mass.

Application June 18, 1947, Serial No. 755,311

2 Claims. (Cl. 296—1)

This invention relates to an improvement in construction of semi-trailers designed to transport over the highways, four or more motor vehicles of the passenger car or light truck type and to an improved method of loading and unloading the same. Such semi-trailers are usually loaded at the factory with completely assembled vehicles, including tires and bumpers, then towed behind a prime mover for hundreds of miles along the highways of many States to the ultimate destination of the vehicles such as the establishments of local distributors.

One type of combination prime mover and trailer is that in which the prime mover itself carries one or two vehicles and the trailer carries two other vehicles as in the patent to Dondlinger, No. 2,146,567, of February 7, 1939, or the patent to Francis, No. 2,132,464, of October 11, 1938. Such two car trailers usually have an opening both at the front and rear to enable cars to be driven through them and up onto the tracks of the prime mover.

They therefore differ in many essential details from four car semi-trailers particularly with reference to the frame members, cross braces and means of moving the upper deck up out of the way while using the lower deck for loading and unloading. In this type of vehicle the prime mover has front and back wheels and the trailer has front and back wheels so that considerable side sway develops and they have been outlawed in many States.

The object of my invention is to provide a semi-trailer capable of holding four or more vehicles, which will conform to the maximum overall length, width and road clearance standards of the majority of States and in which the load will be compressed into considerably less overall vertical height than has been done previously. By semi-trailer I mean an elongated box like frame with dual type wheels at the rear and with the front end supported by the prime mover or tractor.

On the eastern seaboard, because of narrow, twisting highways, the maximum measurements permitted by the majority of States for semi-trailers is a length of thirty-five feet, width of eight feet and height of thirteen and one-half feet. Such a semi-trailer can carry four medium sized modern automobiles, only if the method of loading and construction of the semi-trailer is carefully planned.

The bumper to bumper length of small and medium sized automobiles has constantly increased until they now range from sixteen to eighteen feet in length. My improved semi-trailer is therefore designed to carry four automobiles, each eighteen feet in length thus accommodating all but the expensive and unusually long vehicles which are not manufactured in enough quantity to affect the use of such semi-trailers.

I fit four eighteen foot automobiles into my thirty-five foot semi-trailer by carrying the two lower vehicles on an inclined plane back to back and carrying the two upper vehicles on a horizontal plane, front to front, but with the rear of one projecting over the front of the semi-trailer. The projection of an upper automobile over the front of the semi-trailer is not objectionable since the space occupied is adjacent to the prime mover and does not increase the overall length of prime mover and semi-trailer.

Despite the height of thirteen and one-half feet, permitted by statute it is not practical for a semi-trailer to be loaded to this height because of the low clearance space of many underpasses found in the rural and older sections of the country. Underpasses occasionally have a clearance as low as twelve feet and with the usual type of four car semi-trailer the load has a minimum height of about twelve feet, nine inches. The driver is thus caused to use an alternate route, and may go several hundred miles out of his way, thereby adding to the cost of transporting the vehicles in time lost, fuel used and additional highway hazards encountered. With the improved construction of my semi-trailer, I achieve a height of about eleven and one-half to twelve feet thus permitting the vehicle to travel over practically every route in the country.

My invention comprises a unitary main frame having a pair of sides, a closed front end, an opening at the back and a bottom track adapted to carry two vehicles, back to back, with the front top of each hood on the same horizontal plane as the front of each vehicle top. I use a unitary upper frame with parallel sides and closed ends which, since it includes an element across the back, completes the four sides of the box like construction of the trailer and gives it the necessary rigidity. My upper frame carries a track adapted to hold two vehicles front to front and permit the rear pair of wheels of each vehicle to straddle the narrow front part of the hood of a lower vehicle and the front pair of wheels to straddle the rear window portion of the same lower vehicle.

I also provide telescoping vertical hydraulic pistons, preferably operated by oil pressure, attached to the upper frame and located proximate the centre of gravity of each vehicle carried on the top track. The pistons are vertically slidable in cylinders built into the sides of the main frame and are capable of lifting the entire upper frame including two vehicles thereby increasing the size of the rear opening of the main frame. In addition, I provide what I call snubbers, one for each end of each vehicle adapted to compress the vehicle springs after loading, thereby gaining an additional three to six inches in space.

I am aware that four car trailers have been constructed with the forward part of the upper frame immovable, but the rear part liftable on a hinge as in the patent to Judd, No. 2,123,630, July 12, 1938. Such trailers have also been constructed with the forward part of the upper frame liftable on a hinge and the rear part liftable on pairs of parallel arms as in the patent to Stuart, No. 2,385,115, September 18, 1945.

However, I have found that my new upper frame, which lifts as a complete one piece unit, provides a more sturdy trailer and saves considerable time in loading and unloading. For example with the divided upper frame construction, to unload the forward lower car, the rear upper car must first be unloaded, then the rear lower car and finally the forward upper car and each car must first be released from its spring snubbing devices.

With my improved trailer, if it is desired to unload the forward lower car, the driver merely raises the upper frame, with its two vehicles, by the power operated lifts, unsnubs the rear lower car, unloads it, and is ready to remove the forward lower vehicle.

My one piece vertically liftable upper frame permits me to drive two vehicles on the lower track, snub them down as far as desired, and then to lower the entire upper frame in one operation down to and around the tops of the snubbed down vehicles. With the type of trailer which has an immovable forward upper frame, the snubbing down of the forward lower vehicle gives no advantage in securing a less overall height, because the frame cannot be correspondingly lowered.

The fact that with my device the vehicles on the upper track can be lifted out of the way by hydraulic means, is a distinct improvement over prior devices whose upper track can only be lifted when empty. Very often it is a lower vehicle which must be unloaded first.

For example, a driver may travel from a loading point such as Buffalo, New York, with four automobiles in his semi-trailer. Upon arrival at a main distributor's establishment such as Boston, Massachusetts, the driver may be instructed to unload the two lower automobiles and deliver the upper two to a sub-distributor elsewhere in Massachusetts. With my device, he can quickly unload from the bottom track by raising the upper frame, then lower the upper frame and continue on to the sub-distributor.

When it is desired to carry beach wagons, or panel trucks, or sedans having a top baggage rack in my semi-trailer, I can load two ordinary vehicles on the lower track and load two of the above vehicles on the upper track, thus adding only about four inches to the total overall height.

West of the Mississippi River and in the South where highways are wide and straight, the statutes generally permit five and six car semi-trailers which may be fifty-three feet long, eight feet wide and twelve feet in height. I can construct my improved semi-trailer to carry five automobiles, two on the bottom track and three on a unitary hydraulically liftable upper frame and track. I can also construct a six car trailer with three automobiles on the bottom and three on the top frame in a similar manner. In such cases the height of the load is twelve feet or less as is shown in the drawings.

My six car semi-trailer, in other respects, is similar to the four car semi-trailer described above. It could be described as four car semi-trailer, cut through the middle transversely and having an eighteen foot horizontal section of lower and upper frame inserted into the middle portion thereof. As shown the end vehicles on the upper track are front to front and the end vehicles on the lower track are back to back and the middle vehicles may be facing to the front or the rear as desired.

In the drawings, Fig. 1 is an elevation, from the rear, of my improved semi-trailer, showing an automobile on the lower tracks and showing the upper frame in the raised position.

Fig. 2 is a side elevation of the device shown in Fig. 1, illustrating the manner in which two automobiles are loaded on the lower tracks.

Fig. 3 is a side elevation similar to Fig. 2, but with the upper frame in the lowered position and all four automobiles snubbed down.

Fig. 4 is a plan view of my semi-trailer showing in dotted lines the hydraulic system for raising the upper frame.

Fig. 5 is an elevation from the rear, showing how the upper frame of my semi-trailer can be raised, when loaded, in order to unload the vehicles on the tracks of the lower frame.

Fig. 6 is a fragmentary side elevation in section of the cylinder and piston of my device.

Fig. 7 is a fragmentary elevation in section on line 7—7 of Fig. 4 showing how the flanged member of the upper frame fits around the top member of the lower frame.

Fig. 8 is a fragmentary view in section of the snubbing mechanism of my device.

Fig. 9 is a side elevation of a modified form of my semi-trailer in which six automobiles may be carried.

As shown in Figs. 1–5, my semi-trailer is of box-like construction and comprises a main lower frame A and a liftable upper frame B. Fixed to the upper frame B are pistons P, P, slidable in cylinders C, C fixed within the side walls of the lower frame A, whereby the upper frame may be raised and lowered by power operated means.

Lower frame A is constructed in a well known manner and may have sheet metal walls combined with structural frame members or may be merely skeletonized of angle irons or channel irons. In either case the bottom 1 of my lower frame is raised at the front portion 2 to form a platform which rests upon and is pivoted to the rear of a prime mover or tractor not shown. Bottom 1 slopes downwardly at 3, to the central portion 4 which clears the highway by the required nine inches. Bottom 1 slopes upwardly at 5, to the housing 6, for the dual rear wheels 7, and has a rear portion 8 with greater road clearance than at 4.

I provide two parallel tracks 9, 9, each having an outside vertical flange 10, along the edge thereof and having a horizontal central portion 13, in the part 4 of bottom 1, and inclined portions 11 and 12 sloping upwardly toward the front and rear to permit vehicles to be loaded on the raised portions 2 and 6 of bottom 1. The bottom of frame A and the contour of tracks 9, 9 is such that two vehicles V, V may be carried on the tracks, back to back, with the top front of each engine hood 20 substantially on the same horizontal plane as the front 21 of the top of each vehicle V.

Side walls 30, 30 of frame A comprise a suitable framework between the bottom 1 and a top horizontal member 40 which is of less distance from part 4 of bottom 1 than the height of a vehicle such as V. Integral with the framework of side walls 30, 30 are the cylinders C, C, each cylinder serving as a vertical member of the framework and being located substantially beneath the centre of gravity of each vehicle carried on upper frame B. I show four such cylinders and their accompanying pistons in Figs. 1–5, which is the preferred number for a four car semi-trailer, but may use more if desired.

The front wall 50 of frame A and the front member 60 of upper frame B are rounded in a well known manner so that upon articulation of the tractor and semi-trailer, a sharp edge will not be presented to endanger other traffic. There is no rear wall in my frame A, there being an opening 45 above the rear member 46 of bottom 1 and the space between side walls 30, 30 is such that a vehicle V may be driven there through when upper frame B is in the raised position.

Upper frame B is a horizontal frame comprising front member 60, parallel side members 61 and 63 and a rear member 62 each member having a depending outside flange 64 along its edges adapted to fit over the outside of side wall members 40 and front member 50 of lower frame A when in the lowered position. Rear member 62 and its flange 64 has no corresponding member of the lower frame A but when in the lowered position provides additional rigidity to the box like construction of my semi-trailer.

As shown in Fig. 7, I may provide holes 47 in members 40 and holes 48 in flange 64 of upper frame B for a plurality of removable pins 49 which serve to lock the two frames together in the lowered position. I have found however that inter-membering my upper and lower frame throughout the entire length of the sides and front of the lower frame A, by means of flange 64 is sufficient to hold the two together during travel without the use of any locking device.

There are no transverse cross members between the pistons of my device or between the tracks or side members 61 and 63 in the vicinity of the pistons because such cross members would interfere with the tops of the vehicles carried in the lower frame A. However I provide cross members 65, 65, intermediate of the upper frame across that portion of the tracks which lies between the sloping backs and also adjacent the windshields of the two vehicles V, V on the lower frame.

I provide two parallel tracks 70, 70 on my upper frame B, each with an outside vertical flange 71 and each having depressed portions at the ends 72 and 73 and in the middle 74. Between the depressed portions are raised sections 75 and 76 of sufficient height to provide room for the tops of vehicles on the lower track. As shown in Fig. 3, the wheels of vehicles on upper tracks 70, 70, when the vehicles are loaded, front to front, rest in the depressed portions 72, 73 and 74 and the raised portions of the tracks at 75, 76 lie between the front and back wheels of each vehicle. After being placed in position on the upper track the vehicles can be snubbed down until the under part thereof at 77 and 78 nearly touches raised portions 75, 76 of tracks 70.

As shown in Fig. 8, I provide a snubbing device under the front and rear of each vehicle V, which comprises a shaft 80, journalled in bearings 81, 81 which are fixed to the underneath side of the tracks 9, 9 or 70, 70 whereby the shaft extends transversely between said tracks. A socket 82 is provided at one end of shaft 80, for a removable handle 83, and a ratchet wheel 84 and pawl 85 is also provided whereby the shaft may be revolved by the handle and locked in position with the pawl. Drums 86, 86 are fixed to shaft 80, between the tracks and each drum carries a chain 87 which may be wound up on said drums.

After each vehicle is in position on the upper and lower tracks, a snubber hook 88 and chain 87 is fastened to each forward front spring shackle and each rearward rear spring shackle and the chain tightened by means of handle 83 thereby flattening the vehicle springs and drawing the height of the vehicle down an amount varying from three to six inches.

I may use air pressure to operate my pistons P, in cylinders C, but prefer to use oil pressure created by a power driven pump on the tractor or prime mover. However, my oil pressure system can be connected to the lubricating oil pressure system of the engine of said tractor or may be a completely independent motor and pump located on the semi-trailer itself.

As shown in Fig. 4, oil pipe 90 is connected to the source of oil pressure, not shown, and feeds into pipes 91, 92, in the side walls of frame A, pipes 91 and 92 being connected to the bottom portion 93 of each cylinder C in a well known manner as shown in Fig. 6. Pressure in pipe 90, 91 and 92 is thus transmitted to the head of piston P in cylinder C and the piston is raised carrying with it the frame B, tracks 70 and vehicles V, V on the upper tracks. Upon release of pressure the weight of the load on the upper frame lowers the piston and forces the oil in cylinder C back through the pipes to the source of pressure.

In Fig. 9, I show a six vehicle semi-trailer L together with a prime mover T, such as may be used in certain States. In view of the length and weight of such trailers, I provide dual wheels 101, in tandem, with a housing 102 located close to the rear of the lower frame J. I also provide six pistons P and cylinders C rather than four to raise upper frame K, each located beneath the centre of gravity of the vehicles V carried on the upper frame.

I claim:

1. In a semi-trailer for transporting four automobiles having a main frame with parallel sides, a closed front and an opening at the rear, a bottom with a raised portion at the front adapted to rest on a tractor and a raised portion at the rear to accommodate dual rear wheels and a lower track on the inside of the bottom adapted to carry two vehicles back to back on inclined planes with the front top of each automobile hood on the same horizontal plane as the front of each automobile top the combination of a one piece upper frame having parallel side members, a front member and a rear member; a pair of tracks carried by said upper frame and having a raised portion to accommodate the top of each automobile on the lower track; means for snubbing each automobile; an exterior, downwardly depending flange on said upper frame adapted to fit around the top members of the sides and front of the main frame when the upper frame is in the lowered position; means for locking the upper frame to the main frame when in lowered position; vertical cylinders integral with and forming part of the side walls of the main frame; vertical pistons slidable in said cylinders and fixed to the upper frame proximate the centre of gravity of each automobile carried thereby; and a fluid pressure system associated with said cylinders for moving said upper frame to the raised position.

2. In a semi-trailer, a lower frame having an opening at the rear, a bottom, a pair of side walls and a front wall, the top of said side and front walls being on the same horizontal plane and less distant from the bottom than the height of an automobile, parallel tracks on said bottom adapted to carry two automobiles back to back on inclined planes, an upper frame comprising a pair of side members, a front member and a rear member, the side and front members of said upper frame each having a downwardly depending flange adapted to rest on and fit around the outside of the top of the corresponding wall of the lower frame; a pair of parallel tracks carried by said upper frame and having a depressed portion at each end and in the middle and a raised portion between each depression, pistons attached to the upper frame and slidable in cylinders located within the side walls of the lower frame and beneath the centre of gravity of each car on the upper frame, snubbing means for snubbing each of said automobiles carried on said upper and lower frames and fluid pressure means connected to said cylinders for raising said pistons.

ELMER F. CROCKETT.

REFERENCES CITED

The following references are of record in the file of this patent:

UNITED STATES PATENTS

| Number | Name | Date |
|---|---|---|
| 1,771,206 | Cohen | July 22, 1930 |
| 1,841,066 | Simning | Jan. 12, 1932 |
| 1,894,534 | Dolan | Jan. 17, 1933 |
| 2,022,375 | Judd | Nov. 26, 1935 |
| 2,119,671 | Francis | June 7, 1938 |
| 2,146,567 | Dondlinger | Feb. 7, 1939 |
| 2,169,648 | Judd | Aug. 15, 1939 |